June 17, 1969  M. J. BROWN  3,450,993
DEVICE FOR MEASURING THE INSTANTANEOUS PRODUCT OF
TWO ELECTRICAL QUANTITIES
Filed April 8, 1966

INVENTOR
M. J. BROWN
BY R. P. Miller
ATTORNEY

United States Patent Office

3,450,993
Patented June 17, 1969

3,450,993
DEVICE FOR MEASURING THE INSTANTANEOUS PRODUCT OF TWO ELECTRICAL QUANTITIES
Martin J. Brown, Princeton, N.J., assignor to Western Electric Company, Incorporated, New York, N.Y., a corporation of New York
Filed Apr. 8, 1966, Ser. No. 541,250
Int. Cl. G01r 13/20
U.S. Cl. 324—121       9 Claims

ABSTRACT OF THE DISCLOSURE

A first electrical quantity is applied to a first of two identical cathode ray tubes to vary the intensity of a first of two electron beams, each quiescently biased to impinge on a point in a strip of resistive material on the inside target face of each tube. A second electrical quantity is applied to both tubes to deflect the electron beams the same distance along the strips. An output voltage which varies as a function of beam intensity and deflection is generated across part of each strip. The output voltage of the second cathode ray tube is utilized to compensate the output of the first tube by eliminating the effects of quiescent operation so that the combined output of both tubes is proportional to the product of the first and second electrical quantities.

---

This invention relates to an electrical multiplier and more particularly to an electrical multiplier wherein two electrical quantities are utilized to control an electron beam to provide an indication of the instantaneous product of the two quantities.

In present day industry, there are many situations wherein it is necessary to obtain the instantaneous product of two electrical quantities over a wide range of frequencies. One such industrial situation is the determination of the instantaneous power delivered to an ultrasonic welding tool. The instantaneous power may be determined by electrically multiplying the instantaneous current by the instantaneous voltage, but there are no simple, inexpensive instruments for performing this type of multiplication over a wide range of frequencies. Another industrial situation is the determination of the product of two differential equations for use in an analog computer wherein the equations are represented as analog voltage quantities.

One object of this invention is to provide a new and improved device for measuring the instantaneous product of two electrical quantities over a wide range of frequencies.

Another object of the invention resides in modulating an electron beam impinging upon a resistive path in accordance with diverse electrical quantities to vary the current through the path and/or the effective resistance of the path to provide an indication of the product of the quantities.

It is a further object of this invention to provide a device for measuring the instantaneous product of two electrical quantities by utilizing the two electrical quantities to control an electron beam.

With these and other objects in view, the present invention contemplates an electrical device wherein an electron beam is controlled by two electrical quantities to electrically multiply the quantities over a wide range of frequencies. Facilities are provided for varying the intensity of the electron beam in response to a first electrical quantity and for deflecting the electron beam in response to a second electrical quantity. The electron beam impinges on a resistivity film to produce a voltage which varies as a function of the intensity of the electron beam and the amount of deflection of the electron beam. Additional facilities are then provided for measuring the voltage across the resistivity film which is indicative of the instantaneous product of the two electrical quantities.

These and other objects, aspects, and advantages of this invention may be appreciated from the following detailed description and from the accompanying drawings, in which.

Figure 1:
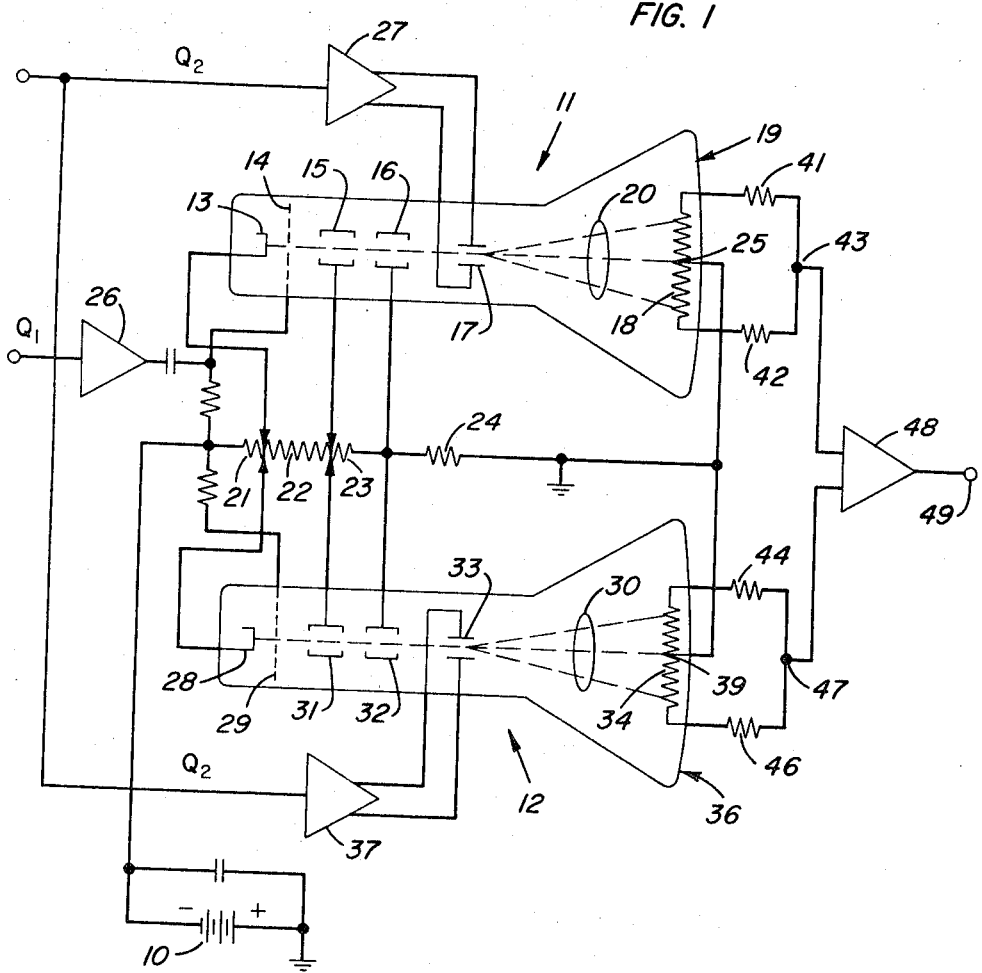
FIG. 1 is an electrical schematic showing of a circuit for controlling an electron beam, embodying the principles of the invention.
Figure 3:
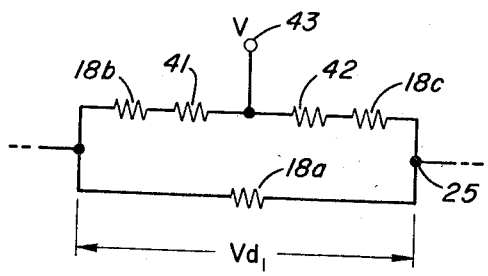
Figure 2:
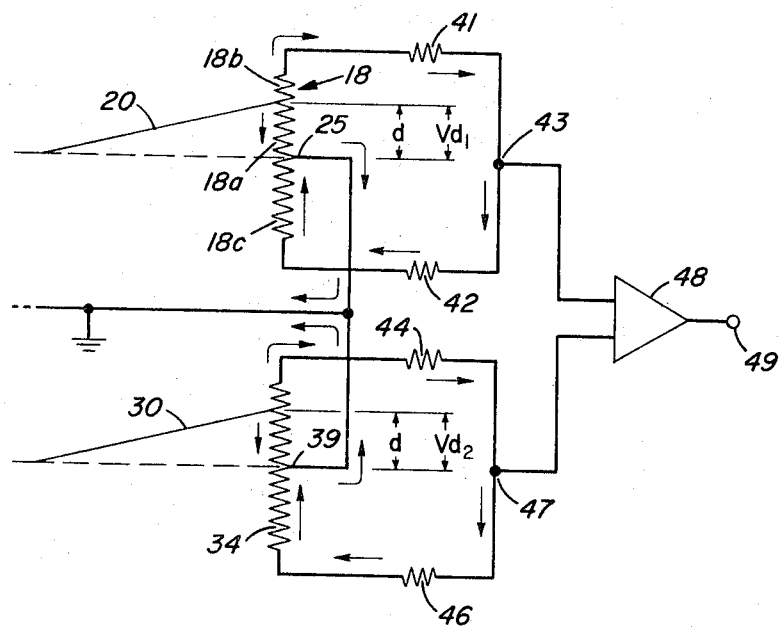
FIG. 2 is an enlarged view of the output portion of the circuit of FIG. 1 illustrating the deflection of the electron beam to effectuate the multiplication of two electrical quantities.
Figure 4:
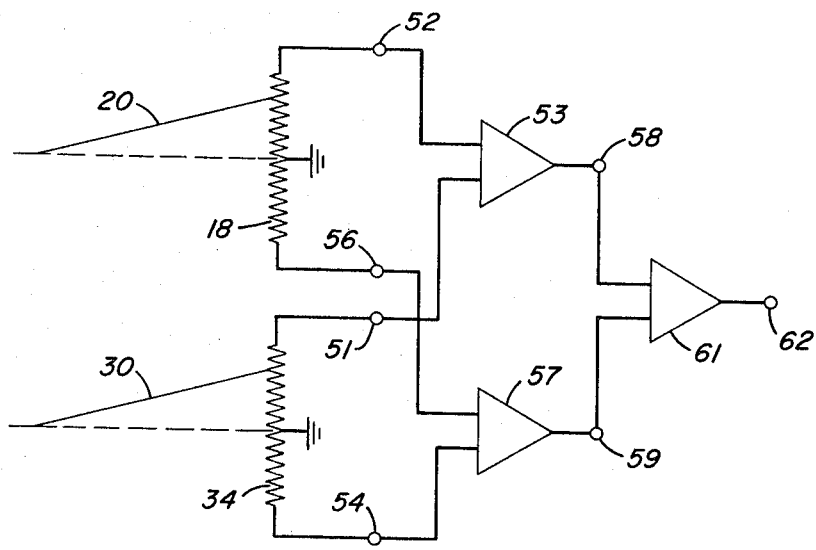

FIG. 3 is a redrawn schematic of a portion of FIG. 2 illustrating the voltage drops established by the impingement of the electron beam on the resistivity film; and FIG. 4 is a view of an alternate output circuit for the basic circuit of FIG. 1, which is utilized to multiply two electrical quantities, either or both of which may be positive or negative, to obtain a product having the appropriate polarity.

Referring generally to FIG. 1, an electronic device for measuring the instantaneous product of two electrical quantities is shown. A first electrical quantity ($Q_1$) is applied to cathode ray tube 11 to vary the intensity of an electron beam. A second electrical quantity ($Q_2$) is also applied to the cathode ray tube 11 to deflect the point at which the electron beam will impinge on and generate a voltage across a strip on the screen of the cathode ray tube. The generated voltage varies as a function of the intensity of the beam and the amount of beam deflection. The second electrical quanity ($Q_2$) is also applied to a second cathode ray tube 12 to develop a compensating voltage which is subtracted from the first generated voltage to provide an output voltage that is representative of the product of the two electrical quantities. This compensating voltage is representative of a D.C. voltage arising from the quiescent current established by the bias voltages of the cathode ray tube 11. This multiplication may take place over a wide range of frequencies, which is only limited by the parameters of standard cathode ray tubes.

More specifically, cathode ray tube 11, has a cathode 13, a control grid 14, a first accelerator anode 15, a second accelerator anode 16, and a pair of deflector plates 17. A strip of resistivity film or resistivity strip 18 is located on the inner face 19 of the tube and replaces the normal phosphor screen. The strip of resistivity film 18 may be composed of tantalum, tungsten, or other applied or sputtered, high resistivity metal film. Although a strip of uniform resistivity film is shown, other geometric configurations such as a spiral or an annulus could be used to increase the length of the path and thus obtain a higher resolution. The impingement of an electron beam 20 on the resistivity strip 18 will establish a current through and a voltage across the strip 18.

Cathode ray tube 11 in the illustrated embodiment is biased for linear operation. Direct current voltages are established across a resistance 21, a resistance 22, a resistance 23, and a resistance 24 by a positive voltage source 10. The voltage across resistance 21 is applied between the grid 14 and the cathode 13 to establish a D.C. electron beam. The voltage across the resistance 22 is applied between the grid 14 and the first anode 15, while the voltage across the resistance 23 is applied the first accelerator anode 15 and the second accelerator anode 16. The voltage across the resistance 24 is applied between the second anode 16 and the center 25 of the resistivity strip 18 causing the D.C. electron beam to impinge on the center 25 of the resistivity strip 18.

The first electrical quantity ($Q_1$), such as a voltage representative of a first member, is applied through an amplifier 26 (introduces no phase shift) across the grid 14 and the cathode 13 of the cathode ray tube 11 to vary the grid bias and, hence, the intensity of the D.C. electron beam. The second electrical quantity ($Q_2$), such as a second voltage representative of a second number, is applied through another amplifier 27 (introduces no phase shift) to the pair of deflector plates 17 to vary the point of beam impingement about the center 25 of the resistivity strip 18.

Considering now the facilities for compensating for the D.C. voltage arising from the quiescent current established by the bias voltages applied to the cathode ray tube 11 which include the cathode ray tube 12 having a cathode 28, a control grid 29, a first accelerator anode 31, a second accelerator anode 32, and a pair of deflector plates 33. Cathode ray tube 12 has a strip of uniform resistivity film or a resistivity strip 34 which is located on the face 36 of the tube 12 and replaces the normal phosphor screen. The electrical and physical characteristics of the second resistivity strip are identical to those of the strip 18 of the cathode ray tube 12. The impingement of an electron beam on the resistivity strip 34 will establish a current through and a voltage across the resistivity strip 34.

Cathode ray tube 12 is biased for linear operation in a manner identical to cathode ray tube 11. The D.C. voltage across the resistance 21 is applied between the control grid 29 and the cathode 28 of tube 12 to establish a D.C. electron beam 30 of the same intensity as that established in cathode ray tube 11. The voltage across the resistance 22 is applied between the grid 29 and the first accelerator anode 31, while the voltage across the resistance 23 is applied between the first anode 31 and the second accelerator anode 32. The voltage across the resistance 24 is applied between the second anode 32 and a center 39 of the strip 34 causing the beam to impinge on this center 39.

The second electrical quantity ($Q_2$) is also applied through an amplifier 37 (introduces no phase shift) to the pair of deflector plates 33 to vary the point of beam impingement about the center 39 of the resistivity strip 34 synchronously with the deflection of the D.C. electron beam 20 about the center 25 of the resistivity strip 18 of the cathode ray tube 11. The center 25 of the resistivity strip 18 and the center 39 of the resistivity strip 34 are both connected to the source of positive voltage 10 to provide return current paths for the electron beams of each tube.

One terminal of a high value isolation resistor 41 is connected to one terminal of the resistivity strip 18 of the tube 11, while one terminal of an identical high value isolation resistor 42 is connected to the other end of the resistivity strip 18. The other terminals of the isolation resistors 41 and 42 are connected to junction 43. Junction 43 is connected to one input of a conventional differential amplifier 48. Both of the isolation resistors 41 and 42 are of high value when compared to the resistance of the resistivity strip 18, while the input resistance of the differential amplifier 48 is of high value when compared to the isolation resistors 41 and 42.

Referring to FIG. 2, the electron beam 20 of the tube 11 is deflected a distance ($d$) from the center 25 of the resistivity strip 18. The impingement of the electron beam on the resistivity strip 18 establishes a first current which flows from the point of impingement through the length ($d$) of the resistivity strip 18 to the center 25 of the strip 18. A second almost negligible current flows from the point of impingement through a portion 18$b$ of the resistivity strip 18, the isolation resistor 41, the isolation resistor 42 (almost no current is lost at the junction 43 because the input impedance of the differential amplifier 48 is very large as compared to the isolation resistor 42), and the lower portion 18$c$ of the resistivity strip 18 to the center 25 of the strip 18. A voltage ($Vd_1$) is established by these currents between the point of beam impingement and the center 25 of the strip 18 which is proportional to the product of the second electrical quantity ($Q_2$) times the sum of a D.C. voltage arising from the quiescent current established by the D.C. bias voltages ($V_{D.C.}$) on cathode ray tube 11 and the first electrical quantity ($Q_1$).

As best illustrated in FIG. 3, the voltage $Vd_1$ is identical to the voltage across the composite resistor comprising elemental resistors 18$b$, 41, 42, and 18$c$. The voltage across each elemental resistor of the composite resistor is proportional to the resistive value of that elemental resistor, since the current through each elemental resistor is identical. Since the elemental resistors 18$b$ and 18$c$ of the resistivity strip 18 are very small compared to the isolation resistors 41 and 42, almost all of the voltage $Vd_1$ is dropped across the resistors 41 and 42. Since the resistors 41 and 42 are identical, approximately one-half of the voltage $Vd_1$ is dropped across each resistor. Thus, approximately one-half of the voltage $Vd_1$ appears at junction 43.

In summary, it may be appreciated that this voltage ($V_{43}$) is thus proportional to the product of the second electrical quantity ($Q_2$) times the sum of a D.C. voltage arising from the quiescent current established by the D.C. bias voltage ($V_{D.C.}$) and the first electrical quantity ($Q_1$). Thus, $V_{43}=K(Q_2V_{D.C.}+Q_1Q_2)$ where K is a constant determined from parameters of the tube.

Considering the simultaneous functioning of tube 12, (see FIGS. 1 and 2) one terminal of another high value isolation resistor 44 is connected to one end of the resistivity strip 34 of the tube 12, while one end of an identical high value isolation resistor 46 is connected to the other end of the resistivity strip 34. The other terminals of the isolation resistors 44 and 46 are connected to a junction 47. Junction 47 is connected as a second input of the differential amplifier 48. Identical isolation resistors 44 and 46 are also identical to the isolation resistors 41 and 42. Both of the isolation resistors 44 and 46 are of high value when compared to the resistance of the resistivity strip 34, while the input resistance of the differential amplifier 48 is of high value when compared to the isolation resistors 44 and 46.

Referring again to FIG. 2, the electron beam 30 of tube 12 is synchronously deflected the same distance ($d$) from the center 39 of its resistivity strip 34 as the electron beam of tube 11 is deflected from the center 25 of its resistivity strip 18. The impingement of the electron beam on the resistivity strip 34 establishes a first current which flows from the point of impingement through the length ($d$) of the resistivity strip 34 to the center 39 of the strip. A second almost negligible current flows from the point of impingement through a portion of the resistivity strip, the isolation resistor 44, the isolation resistor 46 (almost no current is lost at the junction 47 because the input impedance of differential amplifier 48 is very large as compared to the isolation resistor 42), and the lower portion of the resistivity strip 34 to the center 39 of the strip 34. A voltage ($Vd_2$) is established between the point of beam impingement and the center 39 of the strip 34 which is proportional to the product of the second electrical quantity ($Q_2$) times the D.C. voltage arising from the quiescent current ($V_{D.C.}$). The voltage appearing at junction 47 may be analyzed and determined in an identical manner as used to analyze and determine the voltage appearing at junction 43. Since the identical isolation resistors 44 and 46 are very large compared to the resistance of the resistivity strip, approximately one-half of the voltage ($Vd_2$) appears at junction 47. This voltage ($V_{47}$) is thus proportional to the product of the second electrical quantity ($Q_2$) times the D.C. voltage established by the D.C. electron beam ($V_{D.C.}$). Thus, $V_{47}=K(Q_2V_{D.C.})$.

Junctions 43 and 47 are connected to differential amplifier 48. The differential amplifier 48 substracts the voltage appearing at the junction 47 ($V_4$) from the voltage at the junction 43 ($V_{43}$), the voltages developed due to the bias voltages appearing at the respective junctions 43 and 47 cancelling out. Thus, the voltage appearing at the output terminal 49 is $$V_{47} - V_{43} = K(Q_2 V_{D.C.} + Q_1 Q_2) - K(Q_2 V_{D.C.}) = K Q_1 Q_2$$

This output voltage $V_{49}$ is thus proportional to the product of the first electrical quantity ($Q_1$) times the second electrical quantity ($Q_2$).

The output voltage $V_{49}$ arising from the operation of the multiplier of output circuits of FIGS. 1 and 2 does not always have the same positive or negative polarity as the actual product of the quantity $Q_1$ and the quantity $Q_2$. The output voltage $V_{49}$ is independent of the positive of negative polarity of $Q_2$. Furthermore, the operation of the multiplier of FIG. 1 introduces a 180-degree phase shift in the polarity of the quantity $Q_1$. Thus, if the quantity $Q_2$ represents a positive-going voltage and the quantity $Q_1$ also represents a positive-going voltage, the output voltage $V_{49}$ would be a negative-going voltage instead of the desired positive-going voltage. This 180-degree phase shift results from the operation of the multiplier of FIG. 1. Similarly, if the quantity $Q_2$ represents a negative-going voltage and the quantity $Q_1$ represents a positive-going voltage, the output voltage $V_{49}$ is the desired negative-going voltage. This results, however, from both the 180-degree phase reversal of the quantity $Q_1$ and the independence of the output voltage $V_{49}$ of the positive or negative polarity of $Q_2$. Thus, the output voltage $V_{49}$ is thus proportional to the negative product of the first quantity $Q_1$ times the absolute value of the second electrical quantity $|Q_2|$.

Attention is directed to FIG. 4 wherein another output circuit is illustrated which provides for both positive and negative-going quantities $Q_2$ and introduces a 180-degree phase shift resulting from the operation of the multiplier circuit. Thus, if the quantity $Q_2$ represents a positive-going voltage and the quantity $Q_1$ also represents positive-going voltages, it is desired that the output will also be a positive-going voltage. In a like manner, if the quantity $Q_2$ represents a negative going voltage and the quantity $Q_1$ represents a positive-going voltage, it is desired that the output will be a negative-going voltage.

More particularly, to effectuate the desired 180° reversal in phase of these output voltages where $Q_2$ represents a positive-going voltage, the output voltage from the cathode ray tube 11 appearing at a terminal 52 is subtracted from the output voltage from cathode ray tube 12 appearing at a terminal 51. This is accomplished by applying these voltages to a differential amplifier 53 which subtracts the voltage at terminal 52 from the voltage appearing at terminal 51 to impress a positive-going voltage to terminal 58 which is applied to an amplifier 61 to give an output at terminal 62 which is representative of a multiplication of the positive-going voltages applied as quantities $Q_1$ and $Q_2$.

In the situation where the quantity $Q_2$ represents a negative-going voltage, the output voltage from the cathode ray tube 12 appearing at a terminal 54 is subtracted from the output voltage from cathode ray tube 11 appearing at a terminal 56 by applying these voltages to a differential amplifier 57. The negative-going output from the amplifier 57 appearing at a terminal 59 is applied to the amplifier 61 to produce a negative-going output on the terminal 62 which is representative of the multiplication of the negative-going input voltage applied as quantity $Q_2$ and the positive-going voltage representative of the applied quantity $Q_1$.

It may be appreciated that if the input quantities $Q_1$ and $Q_2$ are varying voltages going positive and negative, the amplifier 61 will produce a composite output which is representative of the multiplication of $Q_1$ and $Q_2$.

Considering another application of the present invention, if the first electrical quantity ($Q_1$) represents an instantaneous sinusoidal current at a particular time and if the second electrical quantity ($Q_2$) represents an instantaneous sinusoidal voltage at the same particular time, the output voltage ($V_{49} = K Q_1 Q_2$) is proportional to the instantaneous power at that particular time.

I claim:
1. In an apparatus for electrically multiplying two electrical quantities,
   a uniform resistivity strip,
   means for establishing a D.C. electron beam which impinges on a predetermined point of said strip,
   means responsive to a first electrical quantity for varying the position of the electron beam about the predetermined point of the resistivity strip to establish a current through and a voltage across the strip,
   means responsive to a second electrical quantity for varying the intensity of the electron beam to further vary the current through and the voltage established across the strip,
   means for measuring the composite voltage established across the uniform resistivity strip which is indicative of the product of the first electrical quantity times the sum of the voltage established by the D.C. electron beam and the second electrical quantity, and
   means for subtracting the voltage established by the D.C. electron beam times the first electrical quantity to obtain the instantaneous product of the first electrical quantity times the second electrical quantity.

2. In a device for measuring the instantaneous product of a first and a second sinusoidal voltage,
   a cathode ray tube including a grid, a cathode, a pair of deflection plates, and a screen consisting of a uniform resistivity strip located on the face of said cathode ray tube,
   means for biasing said cathode ray tube to establish a D.C. beam current which impinges on the center point of the resistivity strip,
   means for applying the first sinusoidal voltage to the pair of deflection plates to deflect the beam current about said center point of the resistivity strip,
   means for applying the second sinusoidal voltage between said grid and said cathode to vary the intensity of the beam current,
   means for measuring the voltage developed across the uniform resistivity strip to indicate the product of the first sinusoidal voltage times the sum of the voltage established by the D.C. electron beam and the second sinusoidal voltage, and
   means for subtracting the product of the voltage established by the D.C. electron beam times the first sinusoidal voltage to obtain the instantaneous product of the first sinusoidal voltage times the second sinusoidal voltage.

3. In an apparatus for measuring the instantaneous power transmitted past a point on an electrical line,
   a cathode ray tube including a grid, a cathode, a pair of deflector plates, and a screen consisting of a uniform film resistivity strip coated on the inside of the face of the cathode ray tube,
   means for biasing the cathode ray tube for establishing a quiescent beam current which impinges on the center of the resistivity strip,
   means responsive to the current of said instantaneous power at said point for obtaining a first potential indicative of the instantaneous current through said line and for applying the first potential to the pair of deflector plates of the cathode ray tube to deflect the beam current about the center of the resistivity strip to establish a current through and a voltage across said strip,
   means for obtaining a second potential responsive to the voltage of the instantaneous power at such point on said electrical line and for applying the second potential between the cathode and grid of the cathode ray tube to vary the intensity of the electron beam to further vary the current through and the voltage across the resistivity strip, means for measuring the voltage across the uniform strip of resistivity film to obtain the product of the sum of the voltage established by the quiescent beam current and the second potential times the first potential, and means for subtracting the product of the voltage established by the quiescent electron beam times the first potential to obtain the product of the first potential times the second potential which is indicative of the instantaneous power.

4. In an apparatus for measuring the instantaneous product of a first and a second sinusoidal voltage, a first cathode ray tube including a cathode, a grid, a pair of deflector plates, and a screen consisting of a uniform resistivity strip coated on the face of the cathode ray tube, a second cathode ray tube including a cathode, a grid, a pair of deflector plates, and a screen consisting of a uniform resistivity strip coated on the face of the cathode ray tube, means for biasing each cathode ray tube for establishing a quiescent beam current in each cathode ray tube which impinges on the center of the resistivity strip, including means for providing a D.C. bias voltage between the cathode and grid of both the first and second cathode ray tubes, means for providing the second sinusoidal voltage between the pair of deflector plates of both the first and second cathode ray tubes for varying the point of beam impingement about the center point of the resistivity strip of each cathode ray tube, means for providing the second sinusoidal voltage between the grid and cathode of the first cathode ray tube to vary the intensity of the beam current of the first cathode ray tube, means for measuring the voltage across the uniform resistivity strip of the first cathode ray tube to obtain the product of the first sinusoidal voltage times the sum of the voltage established by the quiescent current and the second sinusoidal voltage, means for measuring the voltage across the uniform resistivity strip of the second cathode ray tube to obtain the product of the first sinusoidal voltage times the voltage established by the quiescent current, and means for subtracting the voltage across the uniform resistivity strip of the second cathode ray tube from the voltage across the uniform resistivity strip of the first cathode ray tube to obtain the instantaneous product of the first sinusoidal voltage times the second sinusoidal voltage.

5. A device for indicating the product of the instantaneous values of two electrical signals comprising:

a cathode ray tube having a cathode, a control grid, a pair of deflecting plates and a target face;

a lamina of resistive material on the target face of said cathode ray tube;

means for quiescently biasing said cathode ray tube to establish a beam of electrons from the cathode of said tube to said lamina impinging at a point thereon to impress an initial current through said tube;

means for connecting a first source of electrical signals to the grid of said cathode ray tube to vary the intensity of the electron beam;

means for connecting a second source of electrical signals to the deflecting plates of said cathode ray tube to deflect the beam to displace it from said quiescent point of impingement on said lamina; and means responsive to the potential difference between the displaced and quiescent points of impingement of electron beam on said lamina for generating an output indicative of the instantaneous product of the first and second signals plus the impressed initial current, and means for subtracting the effect of the impressed initial current from said output to produce an output signal representative of the product of said first and second electrical signals 6. A device as defined in claim 5 wherein said subtracting means includes:

a second cathode ray tube having a cathode, a pair of deflecting plates and a target face;

a lamina of resistive material on the target face of said second cathode ray tube;

means for quiescently biasing said second cathode ray tube to establish a beam of electrons from the cathode of said second tube to said lamina impinging at a point thereon;

means for connecting said second source of electrical signals to the deflecting plates of said second cathode ray tube to deflect the beam to displace it from said quiescent point of impingement on said lamina; and means utilizing the potential difference between the displaced and quiescent points of impingement of the electron beam of said lamina of said second tube for eliminating the effects of quiescent operation of the first cathode ray tube from the potential difference between the displaced and quiescent points on said lamina on the face of said first tube.

7. A system for providing an output indicative of the instantaneous product of the magnitude of two electrical signals comprising:

a first conductive target;

a second conductive target;

a first source of electrons for generating a first electron beam and impinging said beam on a reference point on said first target;

a second source of electrons for generating a second electron beam and impinging said beam on a reference point on said second target;

a conductive path between the reference points of said first and second targets;

means for connecting said conductive path to said first and second sources of electrons;

means for deflecting the first electron beam and the second electron beam in synchronism;

means connecting a first source of electrical signals to said deflecting means for deflecting the beam and displacing them from their reference positions to establish a potential difference on each target between the displaced and reference points of impingement of each electron beam;

means for controlling the intensity of the first electron beam from said first source of electrons;

means connecting a second source of signals to said intensity controlling means for altering the potential difference between the displaced and reference points of beam impingement on said first target;

differential means having two signal inputs and an output for providing an output proportional to the difference of two signals applied to the signal inputs; and means connecting the altered potential difference on said first target and the potential difference on said second target to the inputs of said differential means for providing an output proportional to the potential differences applied to said inputs indicative of the instantaneous product of the signals from said first and second sources.

8. A system as described in claim 7, wherein:

said differential means includes means for altering the polarity of the input signals applied to said differential means to provide an output having a polarity consistent with the algebraic sign of the instantaneous product of the signals from said first and second sources.

9. In a device for measuring the instantaneous product of two electrical quantities, a circuit having a resistivity film susceptible of passing a current in response to the impingement of an electron beam, means for impinging an electron beam of initial intensity on said resistivity film, means for deflecting said beam along the strip in accordance with the first electrical quanitity, means for varying the intensity of the electron beam in accordance with the second electrical quantity, wherein the improvement comprises:

means for generating a first signal which is the product of the voltage due to the intensity of the initially applied electron beam times the instantaneous value of the second electrical quantity;

means for generating a second signal which is equal to the sum of the first signal plus the product of said first and second electrical quantities; and means for substracting the first electrical signal from the second electrical signal to generate a signal indicative of the product of the first electrical quantity times the second electrical quantity.

References Cited
UNITED STATES PATENTS

| | | | |
|---|---|---|---|
| 2,477,547 | 7/1949 | Riggen | 332—58 |
| 2,269,584 | 1/1942 | Eldredge | 324—43 XR |
| 2,507,590 | 5/1950 | Clark | 324—121 XR |
| 2,702,158 | 2/1955 | Winter | 235—194 |

RUDOLPH V. ROLINEC, *Primary Examiner.*

E. F. KARLSEN, *Assistant Examiner.*

U.S. Cl. X.R.

235—194